Patented Nov. 5, 1929

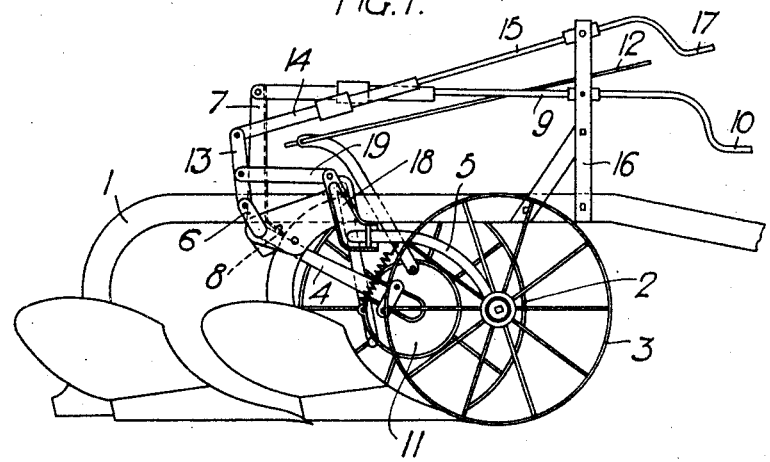
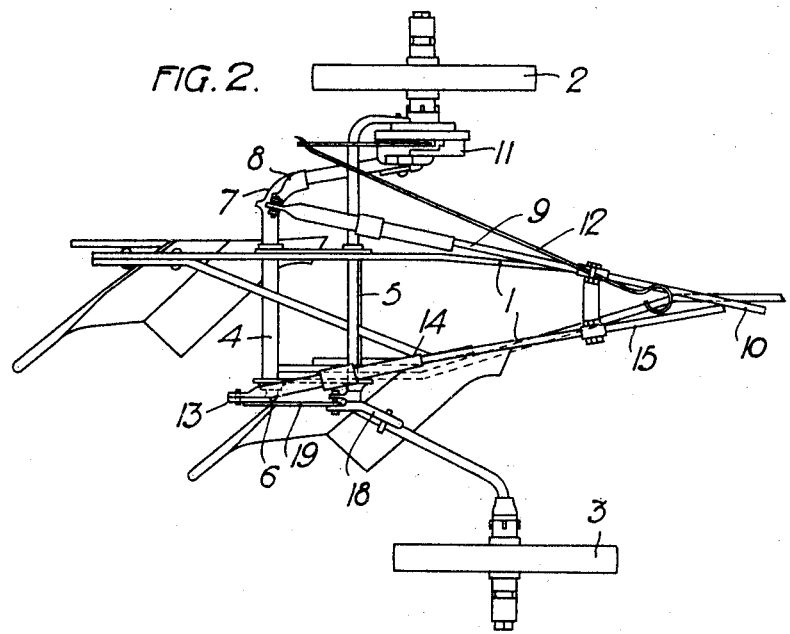

1,734,878

UNITED STATES PATENT OFFICE

OSCAR ADOLF KRISTIAN PRINTZ, OF OVERUM, SWEDEN

PLOW

Application filed June 13, 1928, Serial No. 285,176, and in Sweden July 12, 1927.

This invention relates to tractor plows of the kind having two supporting wheels mounted on crank axles and particularly to that type of such plows which is provided with a mechanism to lift the plow bases out of engagement with the ground by power derived from one of the supporting wheels, a mechanism to adjust the depth of plowing, and a mechanism to raise or lower the plow bases relatively to each other. The said last-mentioned mechanism, that is, the mechanism to adjust the plow bases relatively to each other, is usually controlled in well known plows of the said type by means of a hand lever with its associated locking segment. The handle of such a hand lever will be at different distance apart from the operator in different adjusting positions of the plow bases with the result that the operator must stop the tractor frequently and step out on the plow frame in order to reach the handle when adjustment of the plow bases with respect to each other shall be effected. Furthermore, such an adjustment by means of a hand lever requires a great deal of power and is, consequently, difficult to effect.

This invention has for its object to overcome said inconvenience by the provision of a mechanism to adjust the relative position of the plow bases which is simple in construction and design and permits the control member, by means of which the mechanism is operated, always to be exactly at the same distance apart from the operator within easy reach of him.

The invention is characterized, chiefly, in that said control member comprises a screw mechanism having an operating handle at a constant distance apart from the operator's seat, said mechanism being connected with a link of a link system connecting the crank axles of the supporting wheels with each other.

In the accompanying drawing one embodiment of the invention is illustrated. Fig. 1 is a side elevation of a tractor plow according to the invention, though with the tractor not illustrated, and Fig. 2 is a top view of the plow.

With reference to the drawing, 1 indicates the plow frame, 2 is the land wheel and 3 is the furrow wheel with their crank axles 4 and 5, respectively, mounted in the plow frame. The crank axle 4 of the land wheel 2 carries a crank arm 6 outside the frame upon its end remote from the wheel 2. At the opposite side of the plow frame a lever 7 is loosely mounted on said axle. Said lever 7 is formed with a lug 8 which projects over that crank of the axle 4 carrying the wheel 2 to provide a stop for limiting the movement of said crank. The lever 7 may be turned by means of a screw mechanism 9 with the operating crank 10 to adjust the depth of the plowing. For raising and lowering the plow bases there is provided a power lift mechanism 11 of well known design with its operating rod 12.

The parts above described are well known per se and form no part of the present invention.

The adjusting mechanism according to the invention as shown in the drawing is constructed in the following way:

The crank 6 of the land wheel axle 4 is connected by a link 13 to an internally threaded sleeve 14 of a screw adjusting device comprising in addition to said sleeve 14 a threaded operating shaft 15 mounted in a standard 16 secured to the plow frame. At its free end the operating shaft 15 is formed with a crank handle 17 within easy reach of the tractor operator so that the operator need not leave his seat in order to grasp the handle 17.

Secured to the furrow wheel axle 5 is a lever 18 connected by a link 19 to an inner point of the link 13. The link system described which interconnects the axles 4 and 5 is so designed that in the raising of the plow bases out of engagement with the ground as well as upon variations of the depth of plowing by means of the respective mechanisms, the resulting raising or lowering of the land wheel 2 relatively to the plow frame will be transmitted to the furrow wheel 3 so as to raise or lower it in the same degree.

If it is desired, on the contrary, to adjust one plow base relatively to the other, that is, to raise or lower the furrow wheel 3 with respect to the land wheel 2, the screw shaft 15 is rotated. This will cause a displacement of the threaded sleeve 14 and a movement of the link 13 about its connection with the crank 6, said movement being transmitted through the medium of link 19, lever 18, and axle 5 to the furrow wheel so as to raise or lower the latter without operating the axle 4 with the land wheel 2.

Adjustment of one plow base relatively to the other may thus be effected by means of the screw 15 which is always at the same distance apart from the operator irrespective of the lifting of the plow bases out of engagement with the ground, and likewise irrespective of changes of the depth of plowing and changes of the level of the plow bases with respect to each other as well.

What I claim is:

1. In a plow, the combination with a plow frame, plow shares carried by said frame, crank axles mounted in said frame, and wheels mounted on said crank axles, of links connecting said crank axles to each other, and an adjusting device connected to one of said links including a rotatable forwardly extending shaft provided with an operating handle on its forward end, said shaft arranged to maintain the handle in unchanged position under all conditions except for its rotation with the shaft.

2. In a plow, the combination with a plow frame, two crank axles mounted therein, and two wheels on said crank axles, of links connecting said crank axles to each other, and a screw adjusting device comprising a non-rotatable threaded member connected to one of said links, another threaded member in engagement therewith rotatably but not slidably mounted in the plow frame, and a forwardly directed operating handle on said last-mentioned member.

3. In a plow, the combination with a plow frame, two crank axles mounted in said frame, land and furrow wheels on said axles, of crank arms on said axles, a screw adjusting device comprising a non-rotatable threaded sleeve, a threaded shaft engaging said sleeve rotatably but not slidably mounted in the plow frame, a link connecting one crank arm to said non-rotatable sleeve, and another link connecting the other crank arm to an inner point of said first-mentioned link.

In testimony whereof I have signed my name.

OSCAR ADOLF KRISTIAN PRINTZ.